(12) United States Patent
Zhang (10) Patent No.: US 10,351,169 B2
(45) Date of Patent: Jul. 16, 2019

(54) GOLF CART FRONT SUSPENSION LIFT KIT (71) Applicant: Yujie Zhang, Simpsonville, SC (US)

(72) Inventor: Yujie Zhang, Simpsonville, SC (US)

( * ) Notice: Subject to any disclaimer, the term of this patent is extended or adjusted under 35 U.S.C. 154(b) by 43 days.

(21) Appl. No.: 15/617,460

(22) Filed: Jun. 8, 2017

(65) Prior Publication Data
US 2018/0354329 A1 Dec. 13, 2018

(51) Int. Cl.
B62D 7/18 (2006.01)
B60G 11/08 (2006.01)

(52) U.S. Cl.
CPC ............... *B62D 7/18* (2013.01); *B60G 11/08* (2013.01); *B60G 2200/44* (2013.01); *B60G 2202/114* (2013.01); *B60G 2204/121* (2013.01); *B60G 2204/14* (2013.01); *B60G 2206/911* (2013.01); *B60G 2300/13* (2013.01); *B60G 2300/26* (2013.01); *B60G 2500/30* (2013.01); *B60Y 2200/23* (2013.01); *B60Y 2304/076* (2013.01)

(58) Field of Classification Search
CPC ............ A63B 55/61; A63B 55/60; B62D 7/18
See application file for complete search history.

(56) References Cited

U.S. PATENT DOCUMENTS

| 1,474,057 | A | * | 11/1923 | Pridemore | B62D 7/18 280/93.512 |
| 5,722,784 | A | * | 3/1998 | Link | B60G 7/008 280/93.512 |
| 5,785,332 | A | * | 7/1998 | Pollock | B62D 7/18 301/131 |
| 6,616,156 | B1 | * | 9/2003 | Dudding | B62D 7/18 280/93.512 |
| 7,392,997 | B2 | | 7/2008 | Sanville et al. | |
| 7,581,740 | B1 | * | 9/2009 | Stimely | B60G 3/20 280/124.136 |
| 8,801,037 | B1 | * | 8/2014 | Inoue | B60G 3/06 280/124.125 |
| 8,967,639 | B2 | * | 3/2015 | Conaway | B60G 5/04 280/124.128 |
| 9,421,837 | B2 | * | 8/2016 | Lake | B60G 11/10 |
| 9,475,357 | B1 | * | 10/2016 | Hinz | B60G 11/28 |
| 10,144,260 | B2 | * | 12/2018 | Durkovic | B60G 3/265 |
| 2007/0267790 | A1 | * | 11/2007 | Furman | B60G 11/107 267/36.1 |
| 2007/0267837 | A1 | * | 11/2007 | Sanville | B60G 3/06 280/124.134 |
| 2008/0067774 | A1 | * | 3/2008 | Sanville | B60G 3/20 280/124.138 |
| 2013/0241167 | A1 | * | 9/2013 | Perri | B60G 11/08 280/124.134 |

* cited by examiner

Primary Examiner — Nicole T Verley
(74) Attorney, Agent, or Firm — Dority & Manning, P.A.

(57) ABSTRACT

A front suspension lift kit for a golf cart includes a kingpin sleeve and a kingpin. The kingpin is configured to extend through both the kingpin sleeve and a steering knuckle of the golf cart. A frame spacer is mountable to a frame of the golf cart, and a leaf spring is mountable to the frame spacer. The frame spacer is configured for positioning the leaf spring such that the leaf spring is spaced from the frame of the golf cart when the frame spacer is mounted to the frame of the golf cart and when the leaf spring is mounted to the frame spacer.

20 Claims, 6 Drawing Sheets

GOLF CART FRONT SUSPENSION LIFT KIT

FIELD OF THE INVENTION

The present subject matter relates generally to lift kits for golf cart front suspensions.

BACKGROUND OF THE INVENTION

A golf cart generally includes a front suspension that connects the golf cart's frame and front wheels. The front suspension allows relative motion between the frame and front wheels. Thus, the front suspension contributes to the handling and ride quality of the golf cart.

A ride height of the front suspension is generally factory selected, and golf cart manufacturers frequently tune the front suspension for road or golf course conditions. Thus, the factory ride height of many gold carts is lower than preferred by some golf carts users. To increase the golf cart's ride height, a lift kit may be added to supplement or replace the factory front suspension. However, known lift kits have certain drawbacks.

As an example, some lift kits completely replace the factory front suspension. Such lift kits are expensive due to the numerous components required to completely replace the factory front suspension. As another example, certain lift kits require modifying the golf cart's frame. In particular, such lift kits can require drilling, welding or cutting the golf cart's frame, and such modifications can be labor intensive and/or require tools not available to all golf carts users.

Accordingly, a golf cart front suspension lift kit that does not require completely replacing the factory front suspension and/or that does not require modifying a frame of the golf cart would be useful.

BRIEF DESCRIPTION OF THE INVENTION

The present subject matter provides a front suspension lift kit for a golf cart. The front suspension lift kit includes a kingpin sleeve and a kingpin. The kingpin is configured to extend through both the kingpin sleeve and a steering knuckle of the golf cart. A frame spacer is mountable to a frame of the golf cart, and a leaf spring is mountable to the frame spacer. The frame spacer is configured for positioning the leaf spring such that the leaf spring is spaced from the frame of the golf cart when the frame spacer is mounted to the frame of the golf cart and when the leaf spring is mounted to the frame spacer. Additional aspects and advantages of the invention will be set forth in part in the following description, or may be apparent from the description, or may be learned through practice of the invention.

In a first exemplary embodiment, a front suspension lift kit for a golf cart includes a kingpin sleeve having a length along an axial direction. A kingpin is receivable within the kingpin sleeve. The kingpin has a length along the axial direction. The length of the kingpin is greater than the length of the kingpin sleeve such that such that the kingpin is configured to extend through both the kingpin sleeve and a steering knuckle of the golf cart. The kingpin sleeve and the steering knuckle of the golf cart are rotatable on the kingpin when the kingpin extends through the kingpin sleeve and the steering knuckle of the golf cart. A frame spacer is mountable to a frame of the golf cart, and a leaf spring is mountable to the frame spacer. The frame spacer is configured for positioning the leaf spring such that the leaf spring is spaced from the frame of the golf cart when the frame spacer is mounted to the frame of the golf cart and when the leaf spring is mounted to the frame spacer.

In a second exemplary embodiment, a front suspension lift kit for a golf cart includes a kingpin sleeve having a length along an axial direction. The length of the kingpin sleeve being no less than two inches and no greater than six inches. A kingpin is configured to extend through both the kingpin sleeve and a steering knuckle of the golf cart. The steering knuckle of the golf cart is rotatable on the kingpin when the kingpin extends through the kingpin sleeve and the steering knuckle of the golf cart. A frame spacer is mountable to a frame of the golf cart, and a leaf spring is mountable to the frame spacer. The frame spacer is configured for positioning the leaf spring such that the leaf spring is spaced from the frame of the golf cart when the frame spacer is mounted to the frame of the golf cart and when the leaf spring is mounted to the frame spacer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It will be understood that the golf cart front suspension lift kits described herein may be used in or with any suitable golf cart. As an example, the front suspension lift kits described herein may be used in or with a Club Car® Precedent golf cart or a Club Car® DS golf cart. Thus, the front suspension lift kits are described in greater detail below in the context of and are illustrated as suitable for use in Club Car® Precedent or Club Car® DS golf carts. However, the present subject matter is not limited to any particular golf car model, style or arrangement. The use of the term "about" when used in conjunction with a numerical value is intended to refer to within twenty five percent (25%) of the stated numerical value.

Figure 1:
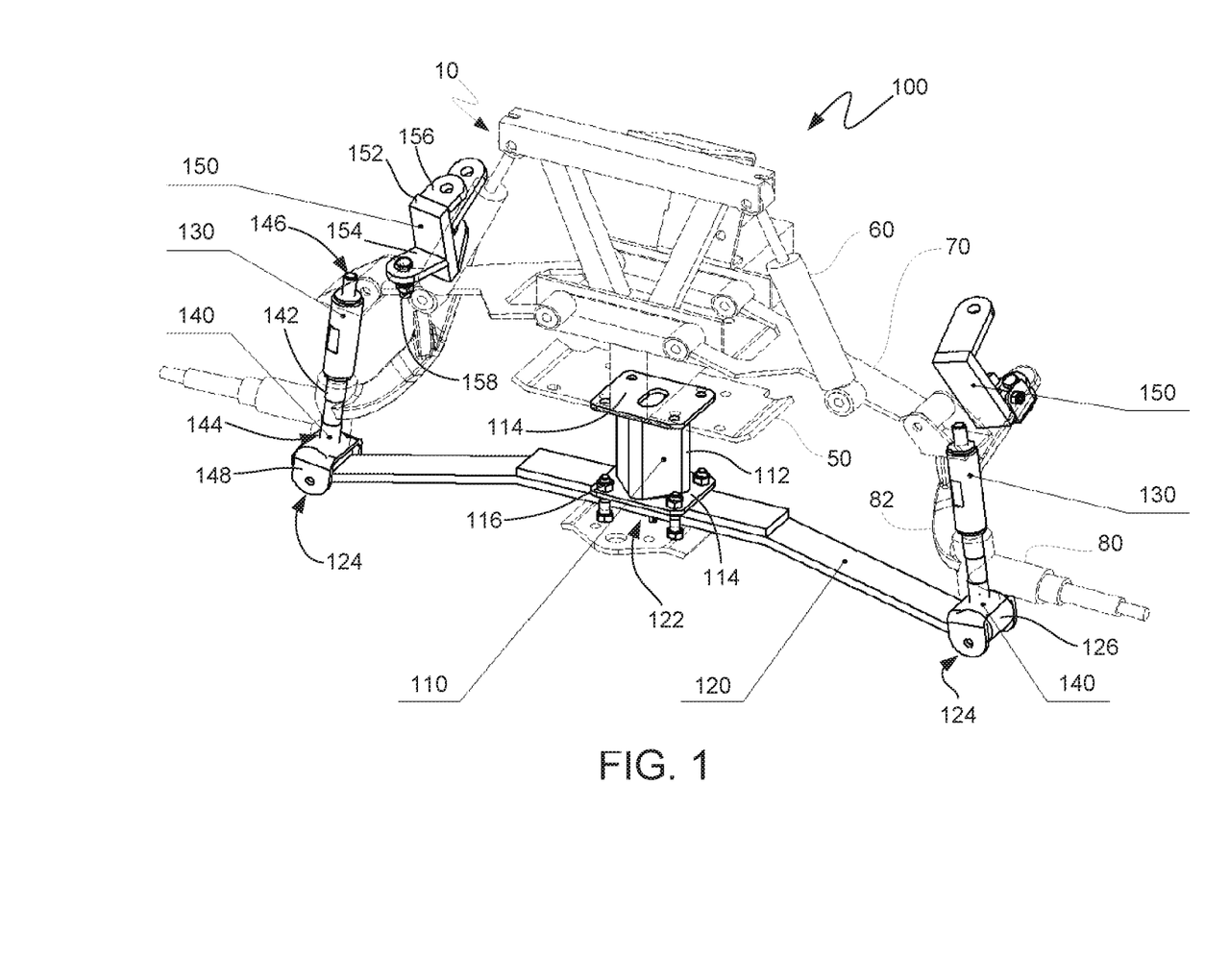
FIG. 1 provides a perspective view of a front suspension lift kit for a golf cart according to a first example embodiment of the present subject matter.
Figure 2:
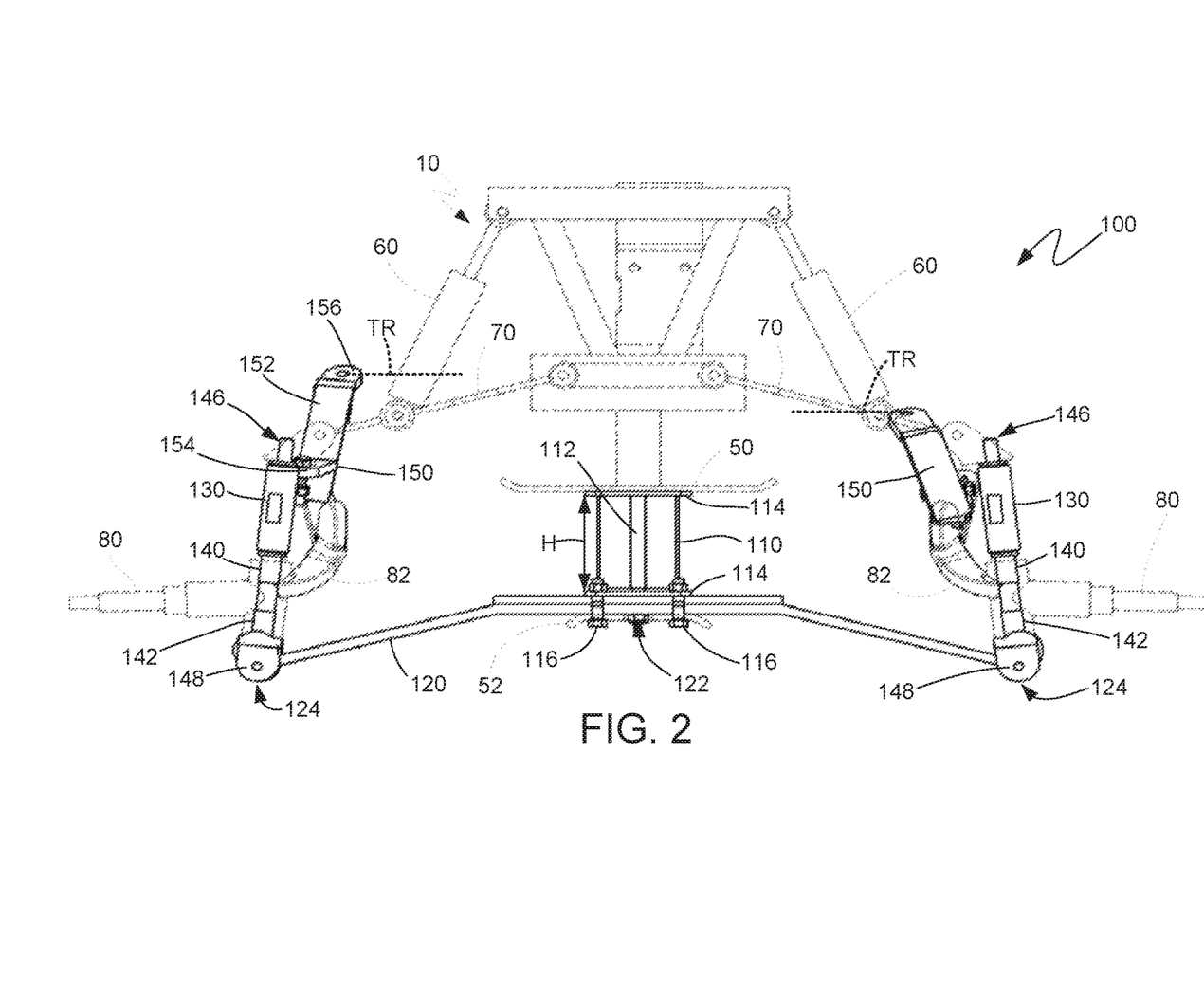
FIG. 2 provides a front, elevation view of the example front suspension lift kit of FIG. 1.
Figure 3:
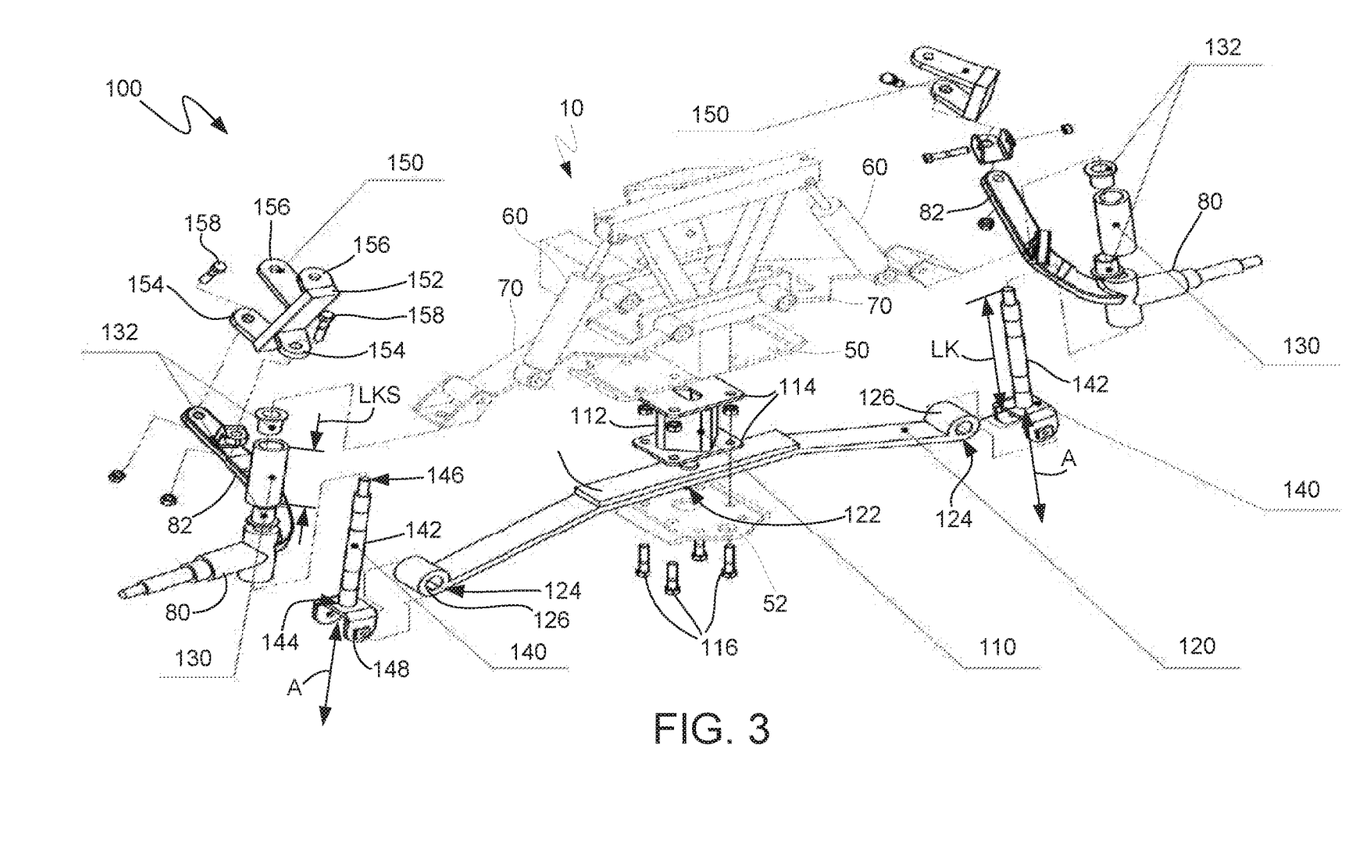
FIG. 3 provides an exploded view of the example front suspension lift kit of FIG. 1.

FIG. 1 provides a perspective view of a front suspension lift kit 100 for a golf cart 10 according to a first example embodiment of the present subject matter. FIG. 2 provides a front, elevation view of front suspension lift kit 100, and FIG. 3 provides an exploded view of front suspension lift kit 100. In FIGS. 1 through 3, components of golf cart 10 are shown in dashed lines while components of front suspension lift kit 100 are shown in solid lines. Components of golf cart 10 may be factory or stock components that front suspension lift kit 100 cooperates with to adjust a ride height of golf cart 10. As may be seen in FIGS. 1 through 3, golf cart 10 includes a frame 50 with a plate 52, shocks 60, swing arms 70 and steering knuckles 80 with steering arms 82. Thus, frame 50, shocks 60, swing arms 70 and steering knuckles 80 may be factory or stock components of golf cart 10 and are not components of front suspension lift kit 100. As discussed in greater detail below, front suspension lift kit 100 may be mounted to or on such existing components of golf cart 10 to adjust the ride height of golf cart 10.

As may be seen in FIGS. 1 through 3, front suspension lift kit 100 includes a frame riser or frame spacer 110. Frame spacer 110 includes an elongated pillar 112 and a pair of end plates 114. End plates 114 are mounted to elongated pillar 112 at opposite ends of elongated pillar 112. Thus, end plates 114 may be spaced from each other on elongated pillar 112. Frame spacer 110 is mountable to frame 50 of golf cart 10. For example, one of end plates 114 may be mounted to frame 50. In particular, the one of end plates 114 may be fastened to frame 50 with bolts that extend through holes in the one of end plates 114 and through holes in frame 50. The holes in frame 50 may be existing holes, e.g., such that drilling of frame 50 is not required to mount frame spacer 110 on frame 50.

When frame spacer 110 is mounted to frame 50, frame spacer 110 may extend, e.g., downwardly, from frame 50 by a height H of frame spacer 110. Thus, as shown in FIG. 2, frame spacer 110 has a height H, e.g., between end plates 114 of frame spacer 110. The height H of frame spacer 110 may be any suitable height. For example, frame spacer 110 is mounted to frame 50 of golf cart 10 to provide a connection point for a leaf spring 120. Thus, e.g., frame spacer 110 may accommodate an increased ride height provided by front suspension lift kit 100 relative to the stock ride height of golf cart 10. As a particular example, the height H of frame spacer 110 may be about two inches (2"), about four inches (4"), about six inches (6"), etc. Thus, e.g., leaf spring 120 may be spaced from frame 50 of golf cart 10 by about two inches (2"), about four inches (4"), about six inches (6"), etc. when frame spacer 110 is mounted to frame 50 of golf cart 10 and when leaf spring 120 is mounted to frame spacer 110.

As discussed above, leaf spring 120 is mountable to frame spacer 110. For example, leaf spring 120 may be mounted to frame spacer 110 at the other of end plates 114 that is not mounted to the frame 50 of golf cart 10. In particular, leaf spring 120 may be supported between the other of end plates 114 and plate 52 of the frame 50, and bolts 116 may extend through holes on plate 114 and on the other of end plates 114 such that leaf spring 120 is sandwiched and/or compressed between the other of end plates 114 and plate 52 of the frame 50.

As shown in FIGS. 1 through 3, leaf spring 120 may be mounted to frame spacer 110 at a middle portion 122 of leaf spring 120, and end portions 124 of leaf spring 120 may be spaced from middle portion 122 of leaf spring 120. Thus, e.g., leaf spring 120 may be mounted to frame spacer 110 such that end portions 124 of leaf spring 120 are cantilevered from frame spacer 110. In such a manner, leaf spring 120 may be elastically deformed to allow relative motion between middle portion 122 of leaf spring 120 that is fixed relative to frame 50 of golf cart 10 and end portions 124 of leaf spring 120 that are moveable relative to frame 50 of golf cart 10.

Front suspension lift kit 100 further includes a kingpin sleeve 130 and a kingpin 140. For the sake of brevity, only one kingpin sleeve 130 and kingpin 140 are discussed in detail herein. However, it will be understood that front suspension lift kit 100 includes two kingpin sleeves and two kingpins, e.g., one each for the right and left side of golf cart 10. The description provided below for kingpin sleeve 130 and kingpin 140 is applicable to both the two kingpin sleeves and the two kingpins of front suspension lift kit 100.

Kingpin 140 is mountable to leaf spring 120. For example, kingpin 140 includes a shaft 142 that extends between a first end portion 144 and a second end portion 146, e.g., along an axial direction A (FIG. 3). A U-bracket 148 is positioned on or at first end portion 144 of shaft 142. For example, U-bracket 148 may be threaded to shaft 142 at first end portion 144 of shaft 142. U-bracket 148 rotatably couples kingpin 140 to leaf spring 120, e.g., to a mounting sleeve 126 on end portion 124 of leaf spring 120. In particular, a shaft (not shown) may extend through the U-bracket 148 and mounting sleeve 126 such that kingpin 140 is rotatably coupled to leaf spring 120 at end portion 124 of leaf spring 120.

Kingpin 140 is also connected to a an A-arm or swing arm 70 of golf cart 10. For example, second end portion 146 of shaft 142 may be connected to swing arm 70 of golf cart 10. In particular, second end portion 146 of shaft 142 may be threaded, and a nut (not shown) may fasten second end portion 146 of shaft 142 to swing arm 70 of golf cart 10. In such a manner, kingpin 140 may extend and be supported between swing arm 70 of golf cart 10 and leaf spring 120. Thus, kingpin 140 is vertically displaceable during operation of golf cart 10, e.g., due to the connection with swing arm 70 of golf cart 10 and leaf spring 120.

As shown in FIGS. 1 through 3, kingpin 140 may extend through both kingpin sleeve 130 and a steering knuckle 80 of golf cart 10. Thus, kingpin 140 is receivable within kingpin sleeve 130. Kingpin sleeve 130 may be rotatable on kingpin 140. In particular, front suspension lift kit 100 may include a pair of bushings 132 that are mountable to kingpin sleeve 130. Bushings 132 may be positioned at opposite ends of kingpin sleeve 130, and shaft 142 of kingpin 140 may contact and be rotatable on bushings 132, e.g., when kingpin 140 extends through kingpin sleeve 130 and/or steering knuckle 80 of golf cart 10. Kingpin 140 is also receivable within steering knuckle 80 of golf cart 10. Thus, steering knuckle 80 of golf cart 10 may rotate on kingpin 140, e.g., when a user turns the steering wheel of golf cart 10. In such a manner, when kingpin 140 extends between and is coupled to swing arm 70 of golf cart 10 and leaf spring 120, kingpin 140 extends through both kingpin sleeve 130 and steering knuckle 80 of golf cart 10, and kingpin 140 may provide a pivot point on which steering knuckle 80 of golf cart 10 and/or kingpin sleeve 130 is rotatable to allow steering of golf cart 10.

As shown in FIG. 3, kingpin sleeve 130 has a length LKS, e.g., along the axial direction A. The length LKS of kingpin sleeve 130 may be any suitable length. For example, the length LKS of kingpin sleeve 130 may correspond to about the increased ride height provided by front suspension lift kit 100 relative to the stock ride height of golf cart 10. As a particular example, the length LKS of kingpin sleeve 130 may be about two inches (2"), about four inches (4"), about six inches (6"), etc. Thus, the length LKS of kingpin sleeve 130 may be about equal to the height H of frame spacer 110.

Kingpin 140 may also have a length LK, e.g., along the axial direction A. The length LK of kingpin 140 is greater than the length LKS of kingpin sleeve 130. In particular, the length LK of kingpin 140 may be greater than the length LKS of kingpin sleeve 130 such that kingpin 140 is configured or sized to extend through both kingpin sleeve 130 and steering knuckle 80 of golf cart 10. Thus, kingpin 140 may be longer than a stock kingpin of golf cart 10 to allow kingpin sleeve 130 to be received on kingpin 140.

As may be seen in FIGS. 1 through 3, front suspension lift kit 100 also includes a steering riser 150. In the example embodiment shown in FIGS. 1 through 3, steering riser 150 is separate from kingpin sleeve 130. Steering riser 150 may include an elongated post 152, a first pair of arms 154 and a second pair of arms 156. First arms 154 and second arms 156 all extend outwardly from elongated post 152, and first arms 154 are spaced from second arms 156 on elongated post 152. First arms 154 of steering riser 150 are configured for mounting to a steering arm 82 of steering knuckle 80. Thus, e.g., first arms 154 may be bolted to steering arm 82 of steering knuckle 80, e.g., with bolts 158. Second arms 156 of steering riser 150 are configured for connecting to a tie rod (shown schematically in FIG. 2 with dashed line TR) of golf cart 10. Thus, e.g., second arms 156 may be bolted to the tie rod of golf cart 10.

Steering riser 150 is mounted to steering arm 82 of steering knuckle 80 to provide a connection point for the tie rod of golf cart 10. Thus, e.g., steering riser 150 may accommodate the increased ride height provided by front suspension lift kit 100 relative to the stock ride height of golf cart 10 and allow the existing steering system of golf cart 10 to connect to front suspension lift kit 100. For example, each second arm 156 may be spaced from a respective first arm 154 on elongated post 152 by about the increased ride height provided by front suspension lift kit 100. As a particular example, each second arm 156 may be spaced from a respective first arm 154 on elongated post 152 by about two inches (2"), about four inches (4"), about six inches (6"), etc. Thus, the spacing between each second arm 156 and the respective first arm 154 on elongated post 152 may be about equal to the length LKS of kingpin sleeve 130 and/or the height H of frame spacer 110.

As may be seen from the above, front suspension lift kit 100 utilizes and/or mounts to existing components of golf cart 10. Thus, front suspension lift kit 100 may provide an economical solution to increase the ride height of golf cart 10. In addition, front suspension lift kit 100 may be installed on golf cart 10, e.g., without requiring drilling, cutting or welding on frame 50 of golf cart 10.

Figure 4:
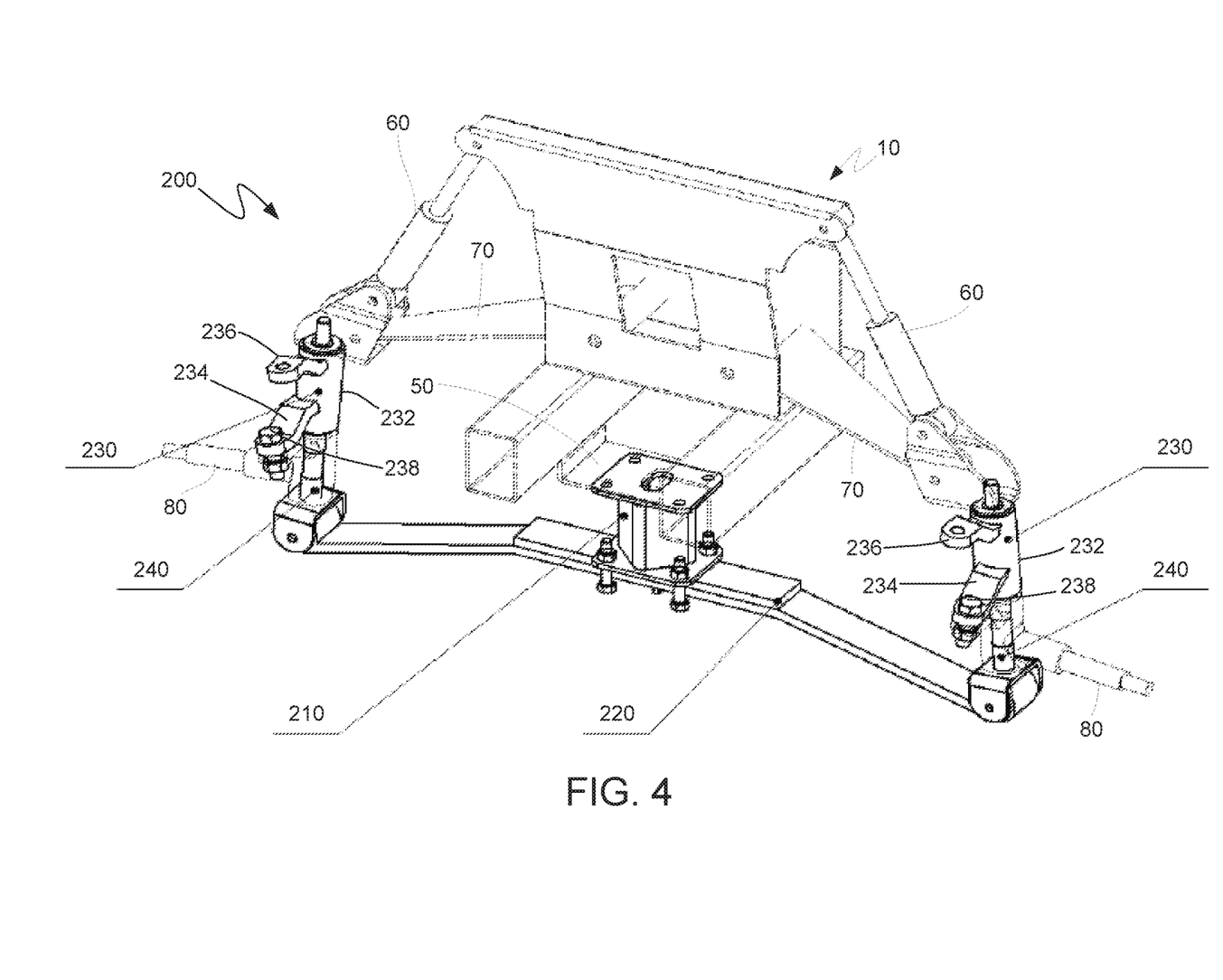
FIG. 4 provides a perspective view of a front suspension lift kit for a golf cart according to a second example embodiment of the present subject matter.
Figure 5:
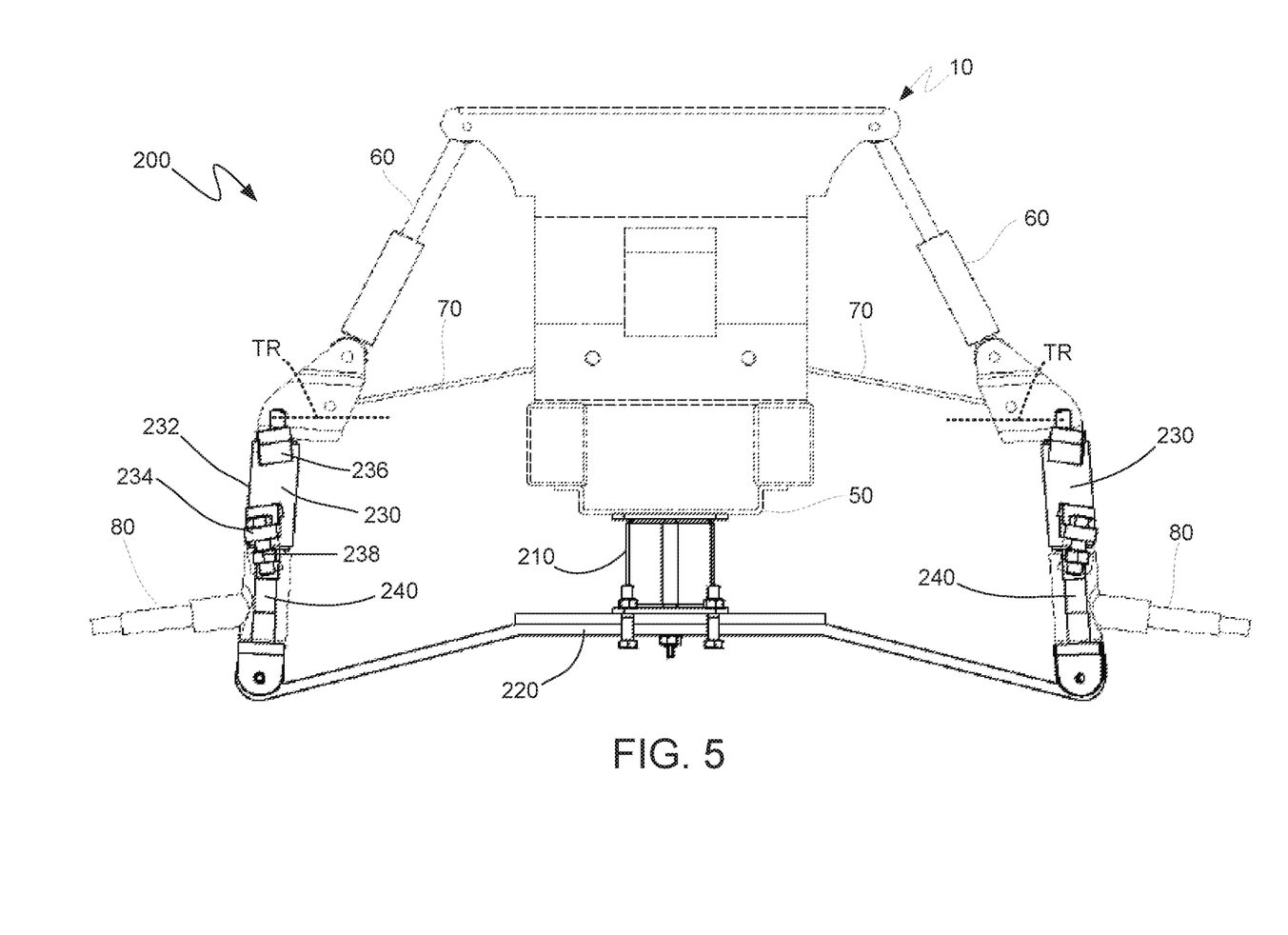
FIG. 5 provides a front, elevation view of the example front suspension lift kit of FIG. 4.
Figure 6:
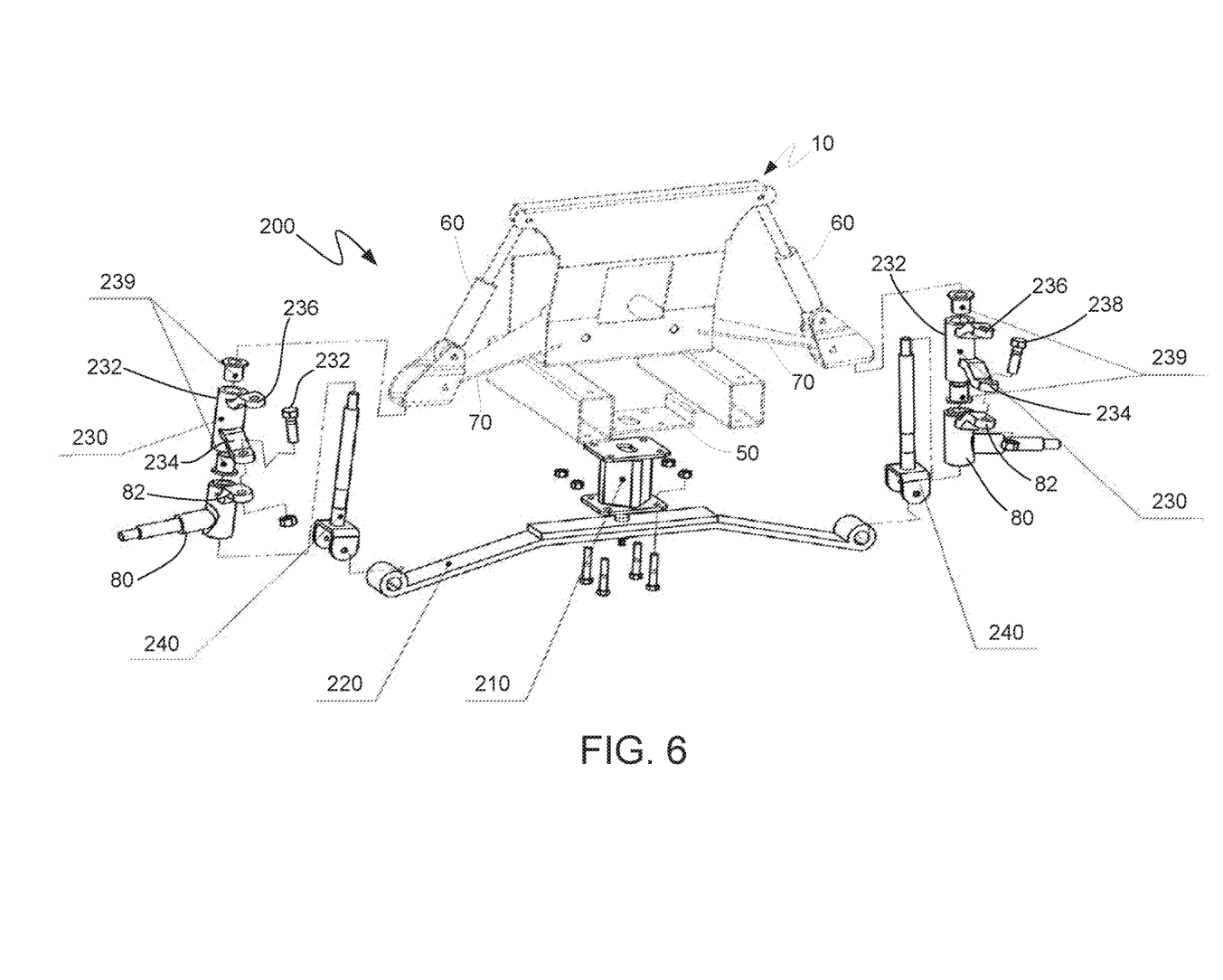
FIG. 6 provides an exploded view of the example front suspension lift kit of FIG. 4.

FIG. 4 provides a perspective view of a front suspension lift kit 200 for a golf cart according to a second example embodiment of the present subject matter. FIG. 5 provides a front, elevation view of front suspension lift kit 200, and FIG. 6 provides an exploded view of front suspension lift kit 200. In FIGS. 4 through 6, components of golf cart 10 are shown in dashed lines while components of front suspension lift kit 200 are shown in solid lines. Front suspension lift kit 200 may be mounted to or on such existing components of golf cart 10 to adjust the ride height of golf cart 10. Front suspension lift kit 200 includes similar components and operates in a similar to front suspension lift kit 100 (FIGS. 1 through 3) described above. For example, front suspension lift kit 200 includes a frame spacer 210, a leaf spring 220, a kingpin sleeve 230 and a kingpin 240, and these component may be constructed in the same or similar manner to the corresponding components of front suspension lift kit 100 described above. Certain differences between front suspension lift kit 200 and front suspension lift kit 100 are discussed in greater detail below.

As may be seen in FIGS. 4 through 6, kingpin sleeve 230 includes a cylinder 232, a first arm 234 and a second arm 236. First arm 234 and second arm 236 of kingpin sleeve 230 are mounted to and extend outwardly from cylinder 232 of kingpin sleeve 230. First arm 234 of kingpin sleeve 230 may be spaced from second arm 236 of kingpin sleeve 230, e.g., along the axial direction A, on cylinder 232 of kingpin sleeve 230. First arm 234 of kingpin sleeve 230 is configured for mounting to steering arm 82 of steering knuckle 80. Thus, e.g., first arm 234 of kingpin sleeve 230 may be bolted to steering arm 82 of steering knuckle 80. In particular, a hole defined by first arm 234 of kingpin sleeve 230 may be aligned with a hole on steering arm 82 of steering knuckle 80, and a bolt 238 may be extended through the hole on first arm 234 and through the hole on steering arm 82 of steering knuckle 80 in order to couple first arm 234 of kingpin sleeve 230 to steering arm 82 of steering knuckle 80, e.g., such that kingpin sleeve 230 and steering knuckle 80 rotate together during steering of golf cart 10. Second arm 236 of kingpin sleeve 230 is configured for connecting to a tie rod (shown schematically in FIG. 5 with dashed line TR) of golf cart 10. Thus, e.g., second arm 236 of kingpin sleeve 230 may be bolted to the tie rod of golf cart 10.

As may be seen from the above, steering riser 150 of front suspension lift kit 100 is integrated onto kingpin sleeve 230 in front suspension lift kit 200. Thus, first arm 234 and second arm 236 of kingpin sleeve 230 provide a connection point for the tie rod of golf cart 10. In addition, kingpin sleeve 230 may accommodate the increased ride height provided by front suspension lift kit 200 relative to the stock ride height of golf cart 10 and allow the existing steering system of golf cart 10 to connect to front suspension lift kit 200. For example, second arm 236 may be spaced from first arm 234 on cylinder 232 by about the increased ride height provided by front suspension lift kit 200. As a particular example, second arm 236 may be spaced from first arm 234 on cylinder 232 by about two inches (2"), about four inches (4"), about six inches (6"), etc. Thus, the spacing between second arm 236 may be spaced from first arm 234 on cylinder 232 may be about equal to the length LKS of kingpin sleeve 230 and/or the height H of frame spacer 210.

As may be seen from the above, front suspension lift kit 200 utilizes and/or mounts to existing components of golf cart 10. Thus, front suspension lift kit 200 may provide an economical solution to increase the ride height of golf cart 10. In addition, front suspension lift kit 200 may be installed on golf cart 10, e.g., without requiring drilling, cutting or welding on frame 50 of golf cart 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A front suspension lift kit for a golf cart, comprising:
a kingpin sleeve having a length along an axial direction;
a kingpin receivable within the kingpin sleeve, the kingpin having a length along the axial direction, the length of the kingpin being greater than the length of the kingpin sleeve such that the kingpin is configured to extend through both the kingpin sleeve and a steering knuckle of the golf cart, the kingpin sleeve and the steering knuckle of the golf cart rotatable on the kingpin when the kingpin extends through the kingpin sleeve and the steering knuckle of the golf cart;
a frame spacer mountable to a frame of the golf cart; and
a leaf spring mountable to the frame spacer, the frame spacer configured for positioning the leaf spring such that the leaf spring is spaced from the frame of the golf cart when the frame spacer is mounted to the frame of the golf cart and when the leaf spring is mounted to the frame spacer.

2. The front suspension lift kit of claim 1, wherein the length of the kingpin sleeve is about four inches.

3. The front suspension lift kit of claim 1, wherein the kingpin comprises a shaft and a U-bracket, the U-bracket positioned on an end of the shaft, the shaft receivable within the kingpin sleeve and the steering knuckle of the golf cart, an end of the leaf spring mountable to the kingpin at the U-bracket of the kingpin.

4. The front suspension lift kit of claim 1, wherein the kingpin sleeve comprises a cylinder and a first arm, the first arm of the kingpin sleeve extending outwardly from the cylinder of the kingpin sleeve, the first arm of the kingpin sleeve configured for mounting to a steering arm of the steering knuckle of the golf cart.

5. The front suspension lift kit of claim 4, wherein a hole defined by the first arm of the kingpin sleeve aligns with a hole on the steering arm of the steering knuckle of the golf cart such that a bolt is extendable through both the hole of the first arm of the kingpin sleeve and the hole on the steering arm of the steering knuckle of the golf cart.

6. The front suspension lift kit of claim 4, wherein the kingpin sleeve further comprises a second arm that extends outwardly from the cylinder of the kingpin sleeve, the second arm spaced from the first arm on the cylinder of the kingpin sleeve along the axial direction, the second arm of the kingpin sleeve configured for connecting to a tie rod of the golf cart.

7. The front suspension lift kit of claim 1, further comprising a steering riser separate from the kingpin sleeve, the steering riser comprising an elongated post, a first arm and a second arm, the first arm extending outwardly from the elongated post of the steering riser, the second arm spaced from the first arm on the elongated post, the second arm extending outwardly from the elongated post of the steering riser, the first arm of the steering riser configured for mounting to a steering arm of the steering knuckle of the golf cart, the second arm of the steering riser configured for connecting to a tie rod of the golf cart.

8. The front suspension lift kit of claim 7, wherein the second arm is spaced from the first arm by about four inches on the elongated post.

9. The front suspension lift kit of claim 1, wherein the frame spacer has a height, the height of the frame spacer being about four inches such that the leaf spring is spaced from the frame of the golf cart by about four inches when the frame spacer is mounted to the frame of the golf cart and when the leaf spring is mounted to the frame spacer.

10. The front suspension lift kit of claim 1, further comprising a pair of bushings mountable to the kingpin sleeve at opposite ends of the kingpin sleeve, a shaft of the kingpin rotatable on the pair of bushings when the kingpin extends through the kingpin sleeve and the steering knuckle of the golf cart.

11. A front suspension lift kit for a golf cart, comprising:
a kingpin sleeve having a length along an axial direction, the length of the kingpin sleeve being no less than two inches and no greater than six inches;
a kingpin configured to extend through both the kingpin sleeve and a steering knuckle of the golf cart, the steering knuckle of the golf cart rotatable on the kingpin when the kingpin extends through the kingpin sleeve and the steering knuckle of the golf cart,
a frame spacer mountable to a frame of the golf cart; and
a leaf spring mountable to the frame spacer, the frame spacer configured for positioning the leaf spring such that the leaf spring is spaced from the frame of the golf cart when the frame spacer is mounted to the frame of the golf cart and when the leaf spring is mounted to the frame spacer.

12. The front suspension lift kit of claim 11, wherein the length of the kingpin sleeve is about four inches.

13. The front suspension lift kit of claim 11, wherein the kingpin comprises a shaft and a U-bracket, the U-bracket positioned on an end of the shaft, the shaft receivable within the kingpin sleeve and the steering knuckle of the golf cart, an end of the leaf spring mountable to the kingpin at the U-bracket of the kingpin.

14. The front suspension lift kit of claim 1, wherein the kingpin sleeve comprises a cylinder and a first arm, the first arm of the kingpin sleeve extending outwardly from the cylinder of the kingpin sleeve, the first arm of the kingpin sleeve configured for mounting to a steering arm of the steering knuckle of the golf cart.

15. The front suspension lift kit of claim 14, wherein a hole defined by the first arm of the kingpin sleeve aligns with a hole on the steering arm of the steering knuckle of the golf cart such that a bolt is extendable through both the hole of the first arm of the kingpin sleeve and the hole on the steering arm of the steering knuckle of the golf cart.

16. The front suspension lift kit of claim 14, wherein the kingpin sleeve further comprises a second arm that extends outwardly from the cylinder of the kingpin sleeve, the second arm spaced from the first arm on the cylinder of the kingpin sleeve along the axial direction, the second arm of the kingpin sleeve configured for connecting to a tie rod of the golf cart.

17. The front suspension lift kit of claim 11, further comprising a steering riser separate from the kingpin sleeve, the steering riser comprising an elongated post, a first arm and a second arm, the first arm extending outwardly from the elongated post of the steering riser, the second arm spaced from the first arm on the elongated post, the second arm extending outwardly from the elongated post of the steering riser, the first arm of the steering riser configured for mounting to a steering arm of the steering knuckle of the golf cart, the second arm of the steering riser configured for connecting to a tie rod of the golf cart.

18. The front suspension lift kit of claim 17, wherein the second arm is spaced from the first arm by about four inches on the elongated post.

19. The front suspension lift kit of claim 11, wherein the frame spacer has a height, the height of the frame spacer being about four inches such that the leaf spring is spaced from the frame of the golf cart by about four inches when the frame spacer is mounted to the frame of the golf cart and when the leaf spring is mounted to the frame spacer.

20. The front suspension lift kit of claim 11, further comprising a pair of bushings mountable to the kingpin sleeve at opposite ends of the kingpin sleeve, a shaft of the kingpin rotatable on the pair of bushings when the kingpin extends through the kingpin sleeve and the steering knuckle of the golf cart.

\* \* \* \* \*